United States Patent [19]
Gaeckel et al.

[11] 3,927,145
[45] Dec. 16, 1975

[54] FLAME RESISTANT POLYOLEFINS

[75] Inventors: Bruno L. Gaeckel, Westmount; Hans R. Larsen, Montreal, both of Canada

[73] Assignee: Union Carbide Canada Limited, Toronto, Canada

[22] Filed: Oct. 29, 1974

[21] Appl. No.: 518,644

[52] U.S. Cl.. 260/897 B; 260/45.7 R; 260/45.75 R; 260/DIG. 24
[51] Int. Cl.² ........................................ C08L 23/08
[58] Field of Search........ 260/897, 45.7 R, DIG. 24, 260/45.75 R

[56] References Cited
UNITED STATES PATENTS

| | | | |
|---|---|---|---|
| 2,953,541 | 9/1960 | Pecha et al. | 260/897 |
| 3,248,359 | 4/1966 | Maloney | 260/41 |
| 3,399,250 | 8/1968 | Kirk et al. | 260/897 |
| 3,723,383 | 3/1973 | Cyba | 260/41 B |

OTHER PUBLICATIONS

Chem. & En, May 17, 1971, p. 1.

*Primary Examiner*—Carman J. Seccuro

[57] ABSTRACT

A composition consisting of polyethylene capable of retaining its flame resistant characteristics for prolonged periods is described which consists of a blend of polyethylene, hexabromobiphenyl, antimony trioxide and a copolymer of ethylene and vinyl acetate, acrylic acid or ethyl acrylate.

7 Claims, No Drawings

FLAME RESISTANT POLYOLEFINS

This invention relates to flame resistant olefin polymers. More particularly it relates to a flame resistant composition of polyethylene and ethylene copolymer.

Many difficulties are encountered in attempting to render polyethylene flame resistant. While certain chlorinated organic compounds are known as being effective for this purpose the quantity required to be added to polyethylene to make it adequately flame resistant is high and has an adverse effect on the physical properties of the polyethylene. Certain brominated organic compounds are also known to improve the flame resistant characteristics of polyethylene when in the presence of antimony trioxide. These brominated compounds have a tendency to "sweat out" however and thus no effective and long lasting flame resistant of polyethylene can be achieved.

It is therefore an object of this invention to provide a flame resistant polyethylene composition which can maintain effective flame resistant characteristics over prolonged periods.

This object is obtained by means of a composition which comprises a polyolefin composition having improved flame resistant characteristics which comprises polyethylene blended with from 5 to 15% by weight of hexabromobiphenyl; from 2 to 15% by weight of antimony trioxide and from 5 to 50% by weight of a copolymer of ethylene and one selected from the group consisting of vinyl acetate, acrylic acid and ethyl acrylate, the weight percentages based on the weight of the polyethylene.

This object is also obtained by means of a method which comprises a method of producing a polyolefin composition having improved flame resistant characteristics which comprises blending low density polyethylene with from 5 to 15% by weight of hexabromobiphenyl, from 2 to 15% by weight of antimony trioxide and from 5 to 50% by weight of a copolymer of ethylene and one selected from the group consisting of vinyl acetate, acrylic acid and ethyl acrylate at about 150°C for 5 minutes, the weight percentages being based on the weight of the polyethylene.

It is known in the art that hexabromobiphenyl can impart flame resistant characteristics to polyethylene and is compatible with certain copolymers of ethylene such as ethylene/vinyl acetate, ethylene/acrylic acid and ethylene/ethyl acrylate.

The applicant has found that hexabromobiphenyl in the presence of these ethylene copolymers can be incorporated into polyethylene to improve its flame resistant characteristics. Furthermore, the applicant has found that the problem of "sweat out" of the hexabromobiphenyl compound is effectively eliminated when added to the polyethylene in the presence of the ethylene copolymer.

It was found that effective reduction of the problem of "sweat out" can be achieved by blending amounts of from 5 to 50% by weight of these copolymers based on the weight of the polyethylene. These copolymers can themselves contain the vinyl acetate, acrylic acid or ethyl acrylate within a broad range. For example, ethylene/vinyl acetate which contains from 5 to 50% by weight of vinyl acetate based on the weight of the copolymer give effective results in polyethylene within the ranges mentioned above. It has been found that for best results however the polyethylene composition should contain from 5 to 15% by weight of hexabromobiphenyl, from 2 to 10% by weight of antimony trioxide and from 10% to 25% by weight of ethylene/vinyl acetate copolymer. If the composition is to be crosslinked it should also contain dicumyl peroxide in a preferred range of from 0.5 to 2.5% by weight. All weight percentages given are based on the weight of the total polyethylene composition. It should be noted that the above percent ranges are for preferred embodiments of the composition. The ethylene copolymer for example may be present in amounts of from 5 to 50% by weight of the composition. While an increased amount of hexabromobiphenyl will require increased amount of ethylene copolymer it is important that the hexabromobiphenyl, antimony trioxide and ethylene copolymer be uniformly dispersed throughout the polyethylene. Such uniform dispersion can be obtained by roll milling, bolling mixing, calendering or extruding.

The following examples illustrate the invention:

EXAMPLE 1

Low density polyethylene having a density of approximately 0.920 g/cu cm, and a melt index of 2.0 dg/min was blended in a roll mill with 7.5% by weight of hexabromobiphenyl, and 2.5% by weight of antimony trioxide. Blending in the roll mill was carried out for about 5 minutes at 150°C. The blend was pressed into a plaque at 130°C. This plaque was subjected to a flame test in accordance with the procedure set out by the American Society of Test Materials as Standard Method D-635-72. In brief this test consists of subjecting a measured specimen to the tip of the outer cone of a bunsen flame for 30 seconds. The polyethylene plaque prepared above satisfied the conditions of "self extinguishing." None of 10 test samples prepared from the plaque had burned to the designated mark.

The flammability of the prepared composition was also tested by the oxygen index method as set out in ASTM Standard Test Method D-2863-70. In this test an oxygen index is calibrated which defines the minimum concentration of oxygen expressed as volume percent in a mixture of oxygen and nitrogen that will just support combustion of the polyethylene composition. The average of 10 test samples gave an oxygen index reading of 24.8.

To determine the degree of exudation of flame retardant from the polyethylene composition plaques of the prepared composition were suspended in air for three days at 65°C and examined visibly. The samples of the above polyethylene composition showed strong exudation as exhibited by a powdery surface, flaking on the plaque surface and a general tacky appearance.

EXAMPLE 2

Polyethylene having a density of approximately 0.920 g/cu cms and a melt index of 2.0 dg/min was blended in a roll mill with 7.5% by weight of hexabromobiphenyl and 2.5% by weight of antimony trioxide. Blending in the roll mill was carried out for about 5 minutes at 150°C and the mill temperature then reduced to 130°C and 2.0% by weight of dicumyl peroxide added. This blend was milled for about one minute and then pressed into a plaque at 130°C and then cured or cross-linked. Test samples prepared from the plaque were found to be self extinguishing when tested according to ASTM method D-635-72 and had an average oxygen index of 23.4. Samples of this composition were subjected to the exudation test described in Example 1.

These samples also showed strong visible exudation in that the surface of the samples were powdery and flaky and the sample material was tacky in appearance.

EXAMPLE 3

A polyethylene composition identical to the composition prepared in Example 1 was prepared but in addition to the hexabromobiphenyl and antimony trioxide, approximately 10.0% by weight of ethylene/vinyl acetate copolymer was blended into the composition in the roll mill at 150°C. This copolymer had a melt index of from 0.9 to 1.5 dg/min and a vinyl acetate content of 27 to 29% by weight. The resulting blend was pressed into a plaque at 130°C. Samples tested according to ASTM Method D-635-72 were found to be self extinguishing. The average oxygen index when tested according to ASTM Method D-2863-70 was 22.9. Exudation tests were carried out as described in Example 1. These test samples exhibited none of the visible characteristics of exudation described in Examples 1 and 2 even when these samples were suspended for three days at the 65° temperature.

EXAMPLE 4

A polyethylene composition identical to the composition prepared in Example 3 was prepared but after blending for 5 minutes at 150°C the mill temperature was reduced to 130°C and 1.5% by weight of dicumyl peroxide added. This blend was milled for about one minute and then pressed into a plaque. Again samples prepared from this plaque was found to be self extinguishing and had an average oxygen index of 21.1. The test samples exhibited none of the visible characteristics of exudation described in Example 1 and 2 when subjected to the exudation test described in these examples.

EXAMPLE 5 to 8

A blend of low density polyethylene having an average density of 0.920 g/cu cm and a melt index of 2.0 dg/min was blended with hexabromobiphenyl (HBBP), antimony trioxide (Sb$_2$O$_3$) and an ethylene/vinyl acetate copolymer (EVA) in amounts shown in Table I below. Examples 6 and 8 also included dicumyl peroxide (DiCup) and cured. The EVA copolymer had a melt index of from 300 to 450 dg/min and a vinyl acetate content of from 27 to 30% by weight. The characteristics of test samples obtained from these blends are as follows:

TABLE I

| Ex | HBB(%) | Sb$_2$O$_3$ (%) | EVA(%) | DiCup(%) | Flame Test | Limiting Oxygen Index | Exudation |
|---|---|---|---|---|---|---|---|
| 5 | 5.0 | 2.5 | 10 | | Self exting. | 23.3 | None |
| 6 | 5.0 | 2.5 | 10 | 1.5 | " | 21.2 | None |
| 7 | 5.0 | 2.5 | 5 | | " | 24.2 | Slight |
| 8 | 5.0 | 2.5 | 5 | 1.5 | " | 21.0 | Slight |

The exudation tests on Examples 7 and 8 are described as "Slight" since only a slight powdery coating was exhibited on the surfaces of the samples but these samples did not show flaking or tacky appearance.

EXAMPLE 9

Ethylene/vinyl acetate copolymer (MI 0.9 – 1.5 dg/min and vinyl acetate content of 27 to 29% by weight) was blended with 10 parts per hundred of hexabromobiphenyl and 2.5 parts per hundred of antimony trioxide on a two roll mill at approximately 150°C for 5 minutes. The resulting blend was pressed into a plaque 8 inches × 8 inches × 0.075 inch thick. No exudation was observed even after exposure to air at 65°C for 3 days. The composition however was non-burning and exhibited an oxygen index reading of 24.2.

EXAMPLE 10

A polyethylene composition identical to the composition prepared in Example 1 was prepared but in addition to the hexabromobiphenyl and antimony trioxide, approximately 10.0% by weight of ethylene/ethyl acrylate was blended into the composition. This copolymer had a melt index of approximately 6.0 G/10 min and an ethyl acrylate content of from 19% to 22% by weight. The resulting blend was pressed into a plaque and found to be self-extinguishing. Exudation tests carried out as described in Example 1 showed no visible characteristics of exudation even after 3 days at 65°C.

EXAMPLE 11

A polyethylene composition containing hexabromobiphenyl and antimony trioxide was prepared as in Example 1 except that approximately 10.0% by weight of ethylene/acrylic acid was also blended into the composition. This copolymer had a melt index of from 3.5 to 6.5 G/10 min. and an acrylic acid content of from 12 to 15% by weight. The resulting blend was pressed into a plaque and found to be self-extinguishing. This blend showed no visible characteristics of exudation even after 3 days at 65°C.

We claim:

1. A polyolefin composition having improved flame resistant characteristics which comprises polyethylene blended with from 5 to 15% by weight of hexabromobiphenyl; from 2 to 15% by weight of antimony trioxide and from 5 to 50% by weight of a copolymer of ethylene and one selected from the group consisting of vinyl acetate, acrylic acid and ethyl acrylate, the weight percentages based on the weight of the polyethylene.

2. A polyolefin composition as claimed in claim 1 wherein said copolymer is ethylene/vinyl acetate containing from 5 to 50% by weight of vinyl acetate based on the weight of the copolymer.

3. A polyolefin composition as claimed in claim 1 wherein said copolymer is ethylene/vinyl acetate containing from 27 to 29% by weight of vinyl acetate based on the weight of the copolymer.

4. A polyolefin composition having improved flame resistant characteristics which comprises polyethylene blended with from 5% to 15% by weight of hexabromobiphenyl, from 2 to 15% by weight of antimony trioxide and from 10 to 25% by weight of a copolymer of ethylene/vinyl acetate, the weight percentages based on the weight of the polyethylene.

5. A polyolefin composition as claimed in claim 4 wherein said composition includes from 0.5 to 2.5% by weight of dicumyl peroxide.

6. A method of producing a polyolefin composition having improved flame resistant characteristics which comprises blending low density polyethylene with from 5 to 15% by weight of hexabromobiphenyl, from 2 to 15% by weight of antimony trioxide and from 5 to 50% by weight of a copolymer of ethylene and one selected from the group consisting of vinyl acetate, acrylic acid and ethyl acrylate at about 150°C for 5 minutes, the weight percentages being based on the weight of the polyethylene.

7. A method as claimed in claim 5 wherein after the 6 minute blending period the temperature is reduced to about 130°C, from 0.5% to 2.5% by weight of dicumyl peroxide is added and the total composition blended for a further one minute.

* * * * *